United States Patent Office 3,441,530
Patented Apr. 29, 1969

3,441,530
BLOCK COPOLYMER POWDERS
Ralph H. Bauer, Huntington Beach, Calif., and Marvin A. Deisz, Akron, Ohio, assignors to Shell Oil Company, New York, N.Y., a corporation of Delaware
No Drawing. Filed Jan. 27, 1965, Ser. No. 428,528
Int. Cl. C08d 3/02; C08f 21/02
U.S. Cl. 260—28.5                                   5 Claims

ABSTRACT OF THE DISCLOSURE

Free flowing block copolymer powders are obtained by forming a hydrocarbon solution of the copolymer and precipitating the polymer with certain polar non-solvents while agitating, the solubility parameters being selectively defined.

---

This invention relates generally to the forming of fine powders from block copolymers. More particularly, the invention relates to the formation of powders from block copolymers by use of a critically limited selective precipitation process.

Finely divided solid polymers having a suitable particle size distribution are required in a number of commercial applications. The latter include the coating of odd shaped articles, textile coating, rotational molding, flame spraying, plastisols, etc. While powders may be formed by mechanical attrition, this is an inefficient and expensive process and, especially, does not lend itself to the preparation of powders from elastomeric materials.

The requirement for the vulcanization of ordinary rubbers in order to achieve their maximum stress-strain properties limits their utility and adds to their cost for the above outlined purposes. A certain class of block copolymers has been discovered which have the unexpected feature of being "self-curing" polymers in that they do not require vulcanization with sulfur containing vulcanizing agents to achieve their maximum stress-strain properties. Hence, it would appear that the utilization of these materials would be highly desirable if a means could be discovered for efficiently and economically converting them into a finely divided powder, preferably a powder which could be utilized in the form of a fluidized bed, for example.

It is an object of the present invention to provide powders of block copolymers. It is a particular object of the invention to provide a process for the preparation of such powdered block copolymers. It is a further object of the invention to provide textiles coated with coalesced block copolymer powders. Other objects will become apparent during the following detailed description of the invention.

Now, in accordance with the present invention, block copolymer powders having maximum diameters less than about 1,000µ (0.039 inch) are provided wherein the block copolymers have the general configuration

A—B—A in which each A is a polymer block of a vinyl arene and B is a polymer block of a conjugated diene as well as hydrogenated derivatives of such polymers.

Still in accordance with this invention, a process for the preparation of such powders is provided by the use of the following steps:

(1) Forming a solution of a block copolymer in a hydrocarbon solvent therefor;

(2) Adding thereto at least an equal volume of a polar organic liquid (more fully described hereinafter) which is miscible with said hydrocarbon with vigorous agitation, whereby a pulverulent polymer product precipitates;

(3) And isolating the powdered product.

Still in accordance with the invention, powders having improved properties are provided by co-precipitation with the block copolymer of 1–100 parts by weight per 100 parts of copolymer (phr.) of an extender of the group consisting of petroleum waxes, tackifying resins, polyolefines, polystyrene, and polyvinyl chloride or of a particulate inorganic filler.

Again in accordance with the invention, a process is provided for the extension of the block copolymers with a rubber extending oil by suspending the powders formed as described above in a liquid immiscible therewith and immiscible with hydrocarbon oils, admixing therewith with vigorous agitation 1–100 parts by weight per 100 parts of polymer of a hydrocarbon extending oil whereby an oil extended powder is formed and isolating the extended powder.

One of the essential aspects of the precipitation process considered herewith is concerned with the solubility parameter relationships of the block copolymer, the hydrocarbon solvent in which they are dissolved and the polar organic liquid utilized for the selective precipitation: In order to achieve the satisfactory particle size and physical properties desired, it is essential that the solubility parameter of the polar organic liquid differ from that of the polymer by at least about 4 units as described in the calculation given hereinafter; and that the solubility parameter of the polar organic liquid differ from that of the hydrocarbon solvent by no more than about 6 units. If these two limitations are not followed, the resulting precipitants are unsatisfactory in one way or another as will be brought out in the following discussion and examples. Where, throughout the specification and claims, reference is made to solubility parameter ($\delta$) units, these are units of the expression (calories/cc.)$^{1/2}$.

The block copolymers to be employed in the present process and powder have the general configuration

A—B—A wherein each A is a polymer block of a vinyl arene and B is a polymer block of a conjugated diene as well as hydrogenated derivatives of such block copolymers. The vinyl arenes to be employed in the preparation of these block copolymers may be styrene, alpha methyl styrene, vinyl toluene, vinyl xylenes, and the like, although styrene is the preferred monomer. Mixtures of such monomers may be employed. The conjugated dienes to be employed in the formation of the polymer block B preferably have from 4–8 carbon atoms per molecule and still more preferably from 4–5. Thus, the preferred species are butadiene and isoprene, although methylisoprene and other conjugated dienes may be utilized as well as mixtures thereof. Hence, the preferred block copolymers are polystyrene-polybutadiene-polystyrene and polystyrene-polyisoprene-polystyrene, as well as hydrogenated derivatives of these polymers.

The hydrogenated materials may be hydrogenated to any desired extent, although the substantially complete hydrogenation of at least the conjugated diene polymer block is desirable. In any event, if hydrogenation is resorted too, it is desired to reduce the original unsaturation of the block copolymer by at least about 50% and preferably by at least about 90%. The reasons for hydrogenation are broadly two-fold in that hydrogenation increases the stability of the product as well as raises the softening point thereof.

The average molecular weight of the polymer blocks, which are determined by a relationship between intrinsic viscosity and osmotic molecular weight, may vary within relatively wide limits but the best results are obtained when the vinyl arene blocks have average molecular weights between about 10,000 and 30,000 while the average molecular weight of the conjugated diene center block is preferably between about 20,000 and 60,000. Still more preferably, it is preferred that the vinyl arene blocks have average molecular weights between about 12,500 and 25,000 and conjugated diene blocks have average molecular weights between about 25,000 and 45,000. The optimum molecular weights are such as to provide the best combination of physical properties for a particular end use. For example, it is preferred to have a high enough plastic block content in the block copolymer to maintain a room temperature modulus in the presence of any hydrocarbon extender oil, particularly when oil is used for the purpose of increasing the melt flow. At the same time, it is preferred that the total molecular weights be restricted to insure good melt flow while retaining adequate room temperature properties.

Since the present invention will be described in its clearest terms by reference to solubility parameters, it will be understood that the units referred to are those derived by the formulae given in the paper by Burrell, published in Interchemical Review, Volume 14, pages 3–16, 31–46 (1955). The solubility parameter $\delta$ is defined as $$\delta = (\Delta E/v)^{1/2}$$

where $\Delta E$ is the energy of vaporization of a gas at zero pressure and $v$ is the molal volume of the liquid. The molal volume is equal to the molecular weight divided by density. The energy of vaporization is defined as the latent heat of vaporization at T °K. ($\Delta H$) minus RT where R is the gas constant 1.986. Thus, the energy of vaporization of a material at 25° C. is equal to the latent heat of vaporization at the same temperature minus 592. The paper paper by Burrell lists a large number of solubility parameters of solvents pertinent to use in the process of the present invention together with solubility parameters of a number of types of rubbers. For the present purpose, the solubility parameters of the block copolymers are estimated to lie between about 8.0 and 9.4. The following table summarizes the solubility parameters of pertinent solvents and certain rubbers:

TABLE I

Solubility parameters of solvents and elastomers arranged by chemical types

Aliphatic hydrocarbons: $\delta$
- Isobutylene — 6.7
- Low odor mineral spirits — 6.9
- Pentane — 7.0
- Hexane — 7.3
- Heptane — 7.4
- Octane — 7.6
- VM and P naphtha — 7.6

Aromatic hydrocarbons:
- Solvesso 150 — 8.5
- Solvesso 100 — 8.6
- Ethylbenzene — 8.8
- Xylene — 8.8
- Toluene — 8.9
- Benzene — 9.2
- Tetralin — 9.5

Other hydrocarbons:
- Methylcyclohexane — 7.8
- Turpentine — 8.1
- Cyclohexane — 8.2
- Dipentene — 8.5

Chlorinated hydrocarbons:
- 2,2-dichloropropane — 8.2
- Carbon tetrachloride — 8.6
- 1,2-dichloropropane — 9.0
- Cloroform — 9.3
- Trichlorethylene — 9.3
- Tetrachlorethylene — 9.4
- Chlorobenzene — 9.5
- Methylene chloride — 9.7
- Ethylene dichloride — 9.8
- o-Dichlorobenzene — 10.0

Ketones:
- Diisobutyl — 7.8
- Diisopropyl — 8.0
- Methyl isobutyl — 8.4
- Methyl amyl — 8.5
- Methyl propyl — 8.7
- Diethyl — 8.8
- Isophorone — 9.1
- Diacetone alcohol — 9.2
- Methyl cyclohexanone — 9.3
- Methyl ethyl — 9.3
- Cyclohexanone — 9.9
- Acetone — 10.0
- Cyclopentanone — 10.4
- Cyclobutadione — 11.0

Esters:
- Isobutyl n-butyrate — 7.8
- Isopropyl isobutyrate — 7.9
- Methyl amyl acetate — 8.0
- Butyl butyrate — 8.1
- Sec. butyl acetate — 8.2
- Sec. amyl acetate — 8.3
- Isobutyl acetate — 8.3
- Isopropyl acetate — 8.4
- Amyl acetate — 8.5
- Butyl acetate — 8.5
- Cellosolve acetate — 8.7
- Propyl acetate — 8.8
- Butyl Cellosolve — 8.9
- Ethyl acetate — 9.1
- Propyl formate — 9.2
- Dibutyl phathalate — 9.4
- Methyl acetate — 9.6
- Ethyl lactate — 10.0
- Butyronitrile — 10.5
- Acetonitrile — 11.9
- Propylene carbonate — 13.3
- Ethylene carbonate — 14.7

Ethers:
- Diethyl — 7.4
- Dimethyl — 8.8
- Dichloroethyl — 9.8
- Dioxane — 9.9
- Cellosolve — 9.9

Alcohols:
- Butyl Carbitol — 8.9
- Butyl Cellosolve — 8.9
- Diethylene glycol — 9.1
- 2-ethylhexanol — 9.5
- Carbitol — 9.6
- Cellosolve — 9.9
- Methyl isobutyl carbinol — 10.0
- n-Octanol — 10.3
- 2-ethylbutanol — 10.5
- n-Hexanol — 10.7
- Sec. butanol — 10.8
- n-Pentanol — 10.9
- n-Butanol — 11.4
- Cyclohexanol — 11.4
- Isopropanol — 11.5
- n-Propanol — 11.9
- Ethanol — 12.7
- Ethylene glycol — 14.2
- Methanol — 14.5
- Glycerol — 16.5

Rubbers:
- Buna N — 9.4
- Chlorinated natural rubbers — 9.4
- SBR — 8.1
- Natural — 8.3
- Neoprene GN — 9.2
- Polybutadiene — 8.6
- Polyisobutylene — 8.1
- Thiokol F and FA — 9.4
- Thiokol RD — 9.0
- Silicone, polydimethyl — 7.3

The block copolymers from which the powders of this invention are prepared are generally soluble in relatively low molecular weight hydrocarbons, particularly in cyclohydrocarbons and mixture of hydrocarbons. It is preferred to utilize relatively low molecular weight solvents so as to facilitate their removal after the formation of the powders. Consequently, it is preferred that the hydrocarbon solvents contain less than about 8 carbon atoms per molecule and preferably between about 3 and 6 carbon atoms per molecule. Hence benzene, cyclohexane are preferred. While the concentration of the polymer in the solvent will depend both on the average molecular weight of the polymer and upon the specific solvent components, it is preferred that solutions have from 5 to 20% solids.

The relative solubility parameters (degree of miscibility) of the solvent and coagulating liquid as well as the block copolymer are extremely important in producing a satisfactory powder. If the solubility parameter of the coagulating liquid is too close to that of the polymer, then the latter is partially soluble in the final solvent mixture and fractionation occurs. This results in loss of material, a change in properties of the final product when compared with those of the starting polymer, and potential agglomeration of the powder particles prior to or during drying.

On the other hand, if the solubility parameter of the coagulating liquid is so far away from that of the hydrocarbon solvent as to result in two immiscible liquid phases, little or no coagulation occurs. Finally, if the solubility parameter of the coagulating liquid significantly different from that of the hydrocarbon but is still barely miscible, then although coagulation takes place the coagulating liquid does not extract sufficient hydrocarbon solvent from the coagulated polymer particle and agglomeration occurs during drying.

Taking all of these considerations together, it has been found extremely important to limit the species of hydrocarbons and polar organic liquids as defined hereinbefore, the solubility parameter of the polar organic coagulating liquid differing from that of the polymer by at least four solubility parameter units and yet differing from that of the hydrocarbon solvent by no more than about six solubility parameter units as calculated according to the formulae and estimations of the Burrell paper referred to hereinbefore.

The polar organic liquid utilized as a coagulating material is preferably an oxygen-containing liquid, either an alcohol, ketone, or ester and preferably having a boiling point or boiling range such that it is readily removed during the drying step subsequent to powder precipitation. Consequently, it is preferred that it have a boiling point no higher than that of butyl alcohol, although higher molecular weight materials may be utilized if drying is effected under reduced pressure. While a mixture of solvent with an equal proportion by volume of the coagulating liquid may in many instances cause powder precipitation, it is preferred that at least about two volumes of coagulating liquid be employed for each part by volume of the polymer solvent. While temperature is not a major influence upon the process of this invention, certain adjustments in temperature may be utilized to coordinate with other process conditions.

Another consideration forming an important aspect of the utilization of these block copolymer powders is the relatively high softening point thereof which present a problem of obtaining a satisfactory film by heating or other means of coalescence subsequent to depositing the powder on a desired site, such as the back of a rug. It has been found that a substantial reduction in softening point without undue loss of physical properties may be obtained by modification of the block copolymer with 1–100 phr. of a petroleum wax, tackifying resin, polyolefines, such as polypropylene or polyethylene, polystyrene, or polyvinyl chloride as well as mixtures of these. The presence of these extenders substantially reduces the softening point of the resultant block copolymer particles and facilitates their coalescence after deposition on a desired site.

The use of particulate inorganic fillers promotes the coagulation of the block copolymer in optimum finely divided state as well as later providing for an extended composition of reduced cost or having special properties. For example, metallic powders such as metallic copper, aluminum or iron may be utilized in order to not only provide the desired degree of nucleation but also to provide elastomeric compositions which may be electrically conductive. The presence of other finely divided materials such as clay, carbon black, and the like provide the desired nucleation for optimum particle formation and later perform the usual function of an inorganic filler which may be either a reinforcing or non-reinforcing material.

The addition of extending oils such as petroleum hydrocarbon oils presents a technical problem but one aspect of the present invention provides a solution thereto: Since the direct addition of a hydrocarbon extending oil to the polymer cement prior to its coagulation resulted in a precipitant which agglomerated undesirably, it was found necessary to form the block copolymer powder as outlined above, thereafter suspend the powder in a liquid immiscible therewith and immiscible with petroleum hydrocarbon oils, followed by admixing therewith in the presence of agitation 1–100 phr. of a hydrocarbon extending oil which thereupon combined with each individual polymer particle, and finally isolating the extended powder from the suspending liquid.

The problem of preventing agglomeration of the particles has also been solved in an unexpected way by the addition of a surfactant which may be cationic, anionic, or non-anionic to the mixture prior to or during the powder precipitation step. The fact that the mixture is essentially nonaqueous makes it especially surprising that materials normally regarded surfactants in aqueous systems have any effect at all. The most effective concentration for the purpose of preventing agglomeration of the particles is between 0.5–5 phr. surfactant.

The block copolymers formed as described above are useful for a number of applications of which the following are representive:

Plastisols.
Fluidized bed coating and molding.
Fabric and paper coating.
Sponge formation by incorporation of blowing agents.
Stabilization of latex foams.
Coatings or binders for solid rocket fuels.
Incorporation of finely divided metals for electrical and magnetic applications.
Short molding cycles of odd shapes.
Rotational molding.
Flame spraying.
Electrostatic spraying.
Fast addition of precise amounts of rubber to organic solvents, and fast subsequent dissolution.
Incorporation of other thermoplastic powders without a hot-melt pre-mixing step.

Of the above applications, one of the most promising is the use of the block copolymer powders for the preparation of rug backings. These are applied for reduction of slip on polished floors and for tuft-lock. The block copolymers are especially useful for this purpose particularly when they are within the average molecular weight limits specified above. Within the specified molecular weight ranges, they exhibit a high filler retention resulting in a reduced cost of the rug backing. They are especially distinguished by their high room temperature modulus even when extended with oil, the oil being added to promote good flow properties of the highly filled rug backing formulation. Rug backings would normally contain from 50 to 300 parts by weight of inorganic filler materials.

The following examples illustrate a number of aspects of the present invention.

EXAMPLE I

Two block copolymers were utilized in determining the effect of relative solubility parameters upon powder formation and the characteristics. One of these was a fully hydrogenated polymer A which before hydrogenation had the block structure polystyrene-polyisoprene-polystyrene The second polymer B was a non-hydrogenated block copolymer having the block structure polystyrene-polybutadiene-polystyrene The block copolymers were dissolved in either benzene or cyclohexane and coagulation into powder form was attempted with a variety of polar liquids including methanol, acetone, water, or ethanol.

Table II also shows the effect of each of these types of precipitants on the powder particles if any where formed in a particular case. It was shown that if the solubility parameter of the coagulating solvent is too close to that of the polymer, then the latter is partially soluble in the final solvent mixture and fractionation occurs. This results in loss of material, change in properties in the final product when compared with those of the starting polymer, and possible agglomeration of the rubber particles prior to or during drying (see cases 2 and 4 of Table II). On the other hand, if the solubility parameter is so far away from that of the hydrocarbon solvent as to result in two immiscible liquid phases, little or no coagulation occurred (case 5 of Table II). Finally, if the solubility parameter of the coagulating solvent was significantly different from that of the hydrocarbon but was still barely miscible then, although coagulation took place the coagulating solvent did not extract sufficient hydrocarbon solvent from the coagulated polymer particle and agglomeration occurs during drying (case 6 of Table II).

EXAMPLE II

The effect of relative solubility parameters on particle size distribution

A 10% concentration of a block copolymer in benzene was utilized for this comparative pair of experiments. The polymer was a fully hydrogenated block copolymer having the structure prior to hydrogenation of polystyrene-polyisoprene-polystyrene, the average block molecular weights being 12,000–20,000–12,000. Two solvents were utilized for coagulation of powdered polymer, namely, methanol and acetone having solubility parameters of 14.5 and 9.9 respectively. The effect of the use of these two coagulants upon particle size distribution will be seen by reference to Table III.

TABLE II.—EFFECT OF RELATIVE SOLUBILITY PARAMETERS ON POWDER CHARACTERISTICS

| Case | Polymer | Cement Solvent | Coagulation Solvent | Observation |
|------|---------|----------------|---------------------|-------------|
| 1 | A (8.1) | Benzene (9.2) | Methanol (14.5) | Discrete powder particles. |
| 2 | A (8.1) | do | Acetone (9.9) | Tendency toward particle agglomeration on drying. Can be eliminated by second stirring in pure acetone. |
| 3 | B (8.6) | do | Methanol (14.5) | Discrete powder particles. |
| 4 | B (8.6) | do | Acetone (9.9) | Incomplete precipitation and partial agglomeration. |
| 5 | B (8.6) | do | Water (24) | Two liquid phases, no coagulation. |
| 6 | B (8.6) | Cyclohexane (8.2) | Methanol (14.5) | Precipitation with particle agglomeration on drying. |
| 7 | B (8.6) | do | Ethanol (~13) | Discrete powder particles. |

NOTES.—Solubility parameters were obtained or estimated from the data of Hildebrand and Scott. The results shown above will also depend on molecular weight and ratio of coagulating solvent to cement solvent in the final mixture. The volume ratio of solvents was 4–7/1. The solubility parameters are given in parentheses.

TABLE III.—EFFECT OF RELATIVE SOLUBILITY PARAMETERS ON PARTICLE SIZE DISTRIBUTION

| Particle Sizes (in.) | Coagulation Solvent, Percent | |
|---|---|---|
| | Methanol | Acetone |
| >.0661 | 0 | 0 |
| .0328–.0661 | 6.8 | 0 |
| .0116–.0328 | 55.4 | 8.8 |
| .0070–.0116 | 22.0 | 14.3 |
| .0041–.0070 | 10.2 | 20.6 |
| .0017–.0014 | 4.5 | 36.6 |
| <.0017 | 1.1 | 19.9 |

EXAMPLE III

The effect of added plasticizers upon melt flow index was determined and compared with that of commercial polyethylene and polypropylene. Table IV below summarizes the results obtained. The oil in certain of the samples was a naphthenic hydrocarbon oil derived from petroleum. It will be noted that in certain of the examples a relatively low molecular weight block copolymer was employed to improve the melt flow index. It is preferred for this purpose that the end blocks of polyvinyl arene have a molecular weight between about 1,000 and 8,000 and that the center block of conjugated diene have an average molecular weight between about 10,000 and 50,000. The low molecular weight block copolymers may be employed in amounts between about 5 and 150 phr. based on the weight of the relatively higher molecular weight block copolymer. The high molecular weight block copolymer employed was a fully hydrogenated block copolymer having the general structure polystyrene-polyisoprene-polystyrene prior to hydrogenation. Since several of these copolymers were utilized, one of the items of Table IV is the block molecular weights of the several polymers. It will be seen by reference to Table IV that the melt index could be increased within the general range of the melt index of commercial polyethylene or polypropylene.

TABLE IV.—MELT INDICES OF BLOCK POLYMERS [a]

| | Polyethylene | Polypropylene | Sample | | | | |
|---|---|---|---|---|---|---|---|
| | | | A | B | C | D | E |
| Block molecular wt.×10³ | | >100 | 12–61–11 | 12–61–11 | 12–61–11 | 12–61–11 | 15–39–15 |
| Additive | None | None | None | 100 phr. [b] | 10 phr. oil | 50 phr. oil | None |
| Melt flow index at— | | | | | | | |
| 200° C | 4.02 | 0.67 | 0.40 | 3.10 | 1.93 | 51.1 | .08 |
| 230° C | 8.13 | 1.38 | 1.93 | | | | 1.07 |

| | Sample | | | | | | | |
|---|---|---|---|---|---|---|---|---|
| | F | G | H | I | J | K | L | M |
| Block molecular wt.×10³ | 15–39–15 | 15–39–5 | 12–20–12 | 12–20–12 | 12–20–12 | 10–50–10 | 10–50–10 | 5–40–5 |
| Additive | 100 phr. [b] | 10 phr. oil | None | 100 phr.[b] | 10 phr. | None | 100 phr.[b] | None |
| Melt flow index at— | | | | | | | | |
| 200° C | 1.14 | 1.06 | 0.92 | 4.65 | 12.6 | 0.69 | 4.65 | 32.2 |
| 230° C | | 9.947 | | | | 2.98 | | |

[a] Determined on extrusion plastometer with a 2,160 g. weight. This corresponds to a pressure or shear stress of ~43.25 p.s.i. See ASTM D1238-57T.

[b] Hydrogenated block copolymer having the structure prior to hydrogenation of polystyrene-polyisoprene-polystrene with block molecular weights of 5,000–5,000–5,000.

EXAMPLE IV

Powders were prepared from mixtures of block copolymer and paraffin wax, the powders being modified further by presence of whiting (precipitated calcium carbonate). The polymer utilized for this purpose was polystyrene-polybutadiene - polystyrene, having block molecular weights of 12,000–46,000–12,000. The powders so obtained were molded at temperatures of 160–180° C. and Table V presents the data obtained on the molded specimens.

TABLE V.—TENSILE PROPERTIES OF MOLDER S-B-S POWDERS

| | | | | | | |
|---|---|---|---|---|---|---|
| SW 100, phr. wax | None | 50 | 50 | 50 | 50 | 100 |
| Whiting, phr | None | None | 100 | 100 | 200 | 20 |
| Molding Temperature, °C | 140 | 140 | 140 | 160 | 140 | 140 |
| Molding Pressure, p.s.i | ~2,000 | ~2,000 | ~2,000 | 10 | ~2,000 | 2,000 |
| Molding Time, min | 0.5 | 0.5 | 0.5 | 0.5 | 0.5 | 0.5 |
| $T_B$, p.s.i | 4,700 | 2,250 | 1,800 | 1,725 | 1,000 | 950 |
| $M_{300}$, p.s.i | 400 | 325 | 300 | 300 | 250 | 200 |
| $M_{500}$, p.s.i | 650 | 725 | 575 | 500 | 350 | 300 |
| $E_B$, percent | 860 | 800 | 790 | 785 | 760 | 840 |

EXAMPLE V

A powder was prepared having the following composition:

Parts by weight

Polystyrene-polybutadiene-polystyrene
(20,000–40,000–20,000 mol wt.) _____ 100
Whiting _____ 200
Naphthenic extender oil _____ 50

The powder was applied to the back of a carpet (1.75 lb./yd.$^2$) and pressed for 30 seconds at 200° C. and 60 p.s.i.g. The resulting product exhibited a high degree of flexibility, good tensile strength and wetting of fibers, satisfactory melt flow and modulus.

We claim as our invention:

1. The process for the formation of block copolymer powders which comprises the steps:
   (1) forming a 5–20% solution of the block copolymer in a volatile liquid hydrocarbon solvent therefor;
   (2) adding thereto at least an equal volume of a polar organic liquid miscible with said hydrocarbon with agitation, whereby a pulverulent finely divided polymer product precipitates;
   (3) and isolating said product; the solubility parameter of the polar organic liquid differing from that of the polymer by at least about 4 (calories/cc.)$^{1/2}$; and differing from that of the hydrocarbon solvent by no more than about 6 (calories/cc.)$^{1/2}$; the block copolymer being selected from the group consisting of polymers having a solubility parameter between about 8.0 and 9.4 (calories/cc.)$^{1/2}$, the solubility parameter being calculated as defined in the specification, and having the general configuration A—B—A wherein each A is a polymer block of a vinyl arene, each block A having an average molecular weight between about 10,000 and 30,000 and B is a polymer block of a conjugated diene having 4–8 carbon atoms per molecule, said block having an average molecular weight between about 20,000 and 60,000, and hydrogenated derivatives of said polymers.

2. A process according to claim 1, wherein the solution of block copolymer contains 1–100 parts by weight per 100 parts of copolymer of an extender of the group consisting of petroleum waxes, tackifying resins, polyolefines, polystyrene, and polyvinyl chloride.

3. A process according to claim 1, wherein the solution of block copolymer contains 1–100 parts by weight per 100 parts of copolymer of a particulate inorganic filler.

4. In a process according to claim 1, the additional steps after step (3) of
   (4) suspending the recovered powder in a liquid immiscible therewith and immiscible with hydrocarbon oils;
   (5) admixing therewith, with agitation, 1–100 parts by weight per 100 parts of polymer, of a hydrocarbon extending oil, whereby an oil extended powder is formed;
   (6) and isolating the extended powder.

5. A process according to claim 1, wherein 0.5–5 phr. of a surfactant is present in step (2).

References Cited

UNITED STATES PATENTS

| | | | |
|---|---|---|---|
| 2,945,020 | 7/1960 | Hall | 260—34.2 |
| 3,214,407 | 10/1965 | Butterworth | 260—34.2 |
| 3,203,916 | 8/1965 | Voet | 260—33.6 |
| 3,265,765 | 8/1966 | Holden et al. | 260—879 |

FOREIGN PATENTS 888,624   1/1962   Great Britain.

MORRIS LIEBMAN, *Primary Examiner.*

H. H. FLETCHER, *Assistant Examiner.*

U.S. Cl. X.R.

260—33.6, 34.2, 41.5, 880, 878, 884